United States Patent
Handgen et al.

(10) Patent No.: US 7,624,234 B2
(45) Date of Patent: Nov. 24, 2009

(54) DIRECTORY CACHES, AND METHODS FOR OPERATION THEREOF

(75) Inventors: Erin A. Handgen, Fort Collins, CO (US); Leith L. Johnson, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 313 days.

(21) Appl. No.: 11/514,549

(22) Filed: Aug. 31, 2006

(65) Prior Publication Data

US 2008/0059710 A1 Mar. 6, 2008

(51) Int. Cl.
*G06F 12/00* (2006.01)
(52) U.S. Cl. .................. 711/128; 711/108; 711/118; 711/119
(58) Field of Classification Search .................. 711/128
See application file for complete search history.

(56) References Cited

U.S. PATENT DOCUMENTS

| 5,634,110 | A | 5/1997 | Laudon et al. | |
|---|---|---|---|---|
| 6,915,388 | B1 | 7/2005 | Huffman | |
| 2007/0168617 | A1* | 7/2007 | Borkenhagen et al. | 711/133 |

FOREIGN PATENT DOCUMENTS

WO 99/26144 5/1999

OTHER PUBLICATIONS

Agarwal, et al.; "An Evaluation of Directory Schemes for Cache Coherence"; IEEE; Feb. 1988; pp. 353-362.
Archibald, et al.; An Economical Solution to the Cache Coherence Problem; IEEE; Nov. 1984; pp. 355-362.
Archibald, et al.; "Cache Coherence Protocols: Evaluation Using a Multiprocessor Simulation Model"; ACM Transactions on Computer Systems; Nov. 1986; vol. 4, No. 4; pp. 273-298.
Chaiken, et al.; LimitLESS Directories: A Scalable Cache Coherence Scheme; ACM; Sep. 1991; pp. 224-234.
Chang, et al.; "An Efficient Tree Cache Coherence Protocol for Distributed Shared Memory Multiprocessors"; IEEE Transactions on Computers; Mar. 1999; vol. 48, No. 3; pp. 352-360.
"DASH (Directory Architecture for Shared Memory DASH)"; Lehrstuhl Fur Rechnerarchitektur—Unversitat Mannheim; Vorlesung Rechnerarchitektur 2; Mar. 2004; pp. 178-182.
"G22.2243-001 High Performance Computer Architecture"; Nov. 30, 2004; pp. 1-26.
Li, et al.; "ADirpNB: A Cost-Effective Way to Implement Full Map Directory-Based Cache Coherence Protocols"; IEEE Transactions on Computers; Sep. 2001; vol. 50, No. 9; pp. 921-934.

* cited by examiner

*Primary Examiner*—Reginald G Bragdon
*Assistant Examiner*—Aracelis Ruiz

(57) ABSTRACT

A directory cache is provided with a plurality of directory entries configured to store information regarding copies of memory lines stored in a plurality of caches. The entries are divided into sets of N entries, with each set of N entries being addressable via an index. The directory cache is also provided with a cache controller. The cache controller retrieves a set of N entries associated with an index corresponding to a memory line, and if a tag portion of one of the retrieved entries corresponds to the memory line, the cache controller determines whether the one of the retrieved entries contains an indication that information regarding the memory line is stored in at least a second one of the retrieved entries.

27 Claims, 4 Drawing Sheets

DIRECTORY CACHES, AND METHODS FOR OPERATION THEREOF

BACKGROUND

Large multiple processor computing systems often employ a directory cache. The directory cache stores information regarding copies of memory lines that are stored in the system's various caches. By way of example, the information stored in a directory cache may comprise information indicating 1) where copies of memory lines are stored, 2) whether the memory lines are stored in single or multiple locations, and 3) whether a memory line has been reserved for exclusive access by a particular cache (meaning that the memory line may be subject to modification).

A directory cache can be useful in that it reduces the number of main memory accesses (and particularly writes) that are undertaken solely for the purpose of cache coherency (i.e., it reduces memory accesses that do not result in a memory line actually being updated). This can yield both increased effective memory bandwidth and reduced memory power consumption.

In some directory caches, the identities of caches where a memory line is stored are encoded in a share vector, where each bit of the vector corresponds to a subset of caches in which a memory line may be stored. In this manner, the precise identities of caches in which a memory line is stored may not be known, but the number of caches which need to be notified in the case of a "modify" operation is limited to a subset of a system's caches. The more bits that can be allotted to the share vector, the greater the resolution of the share vector. However, the number of bits that can be allotted to a share vector is often limited by 1) the relatively small number of bits that are allotted to each of a directory cache's entries, and 2) the use of many, if not most, of a directory cache entry's bits for overhead purposes, such as the storage of address tag bits.

BRIEF DESCRIPTION OF THE DRAWINGS

Illustrative embodiments of the invention are illustrated in the drawings, in which.

DETAILED DESCRIPTION

Figure 1:
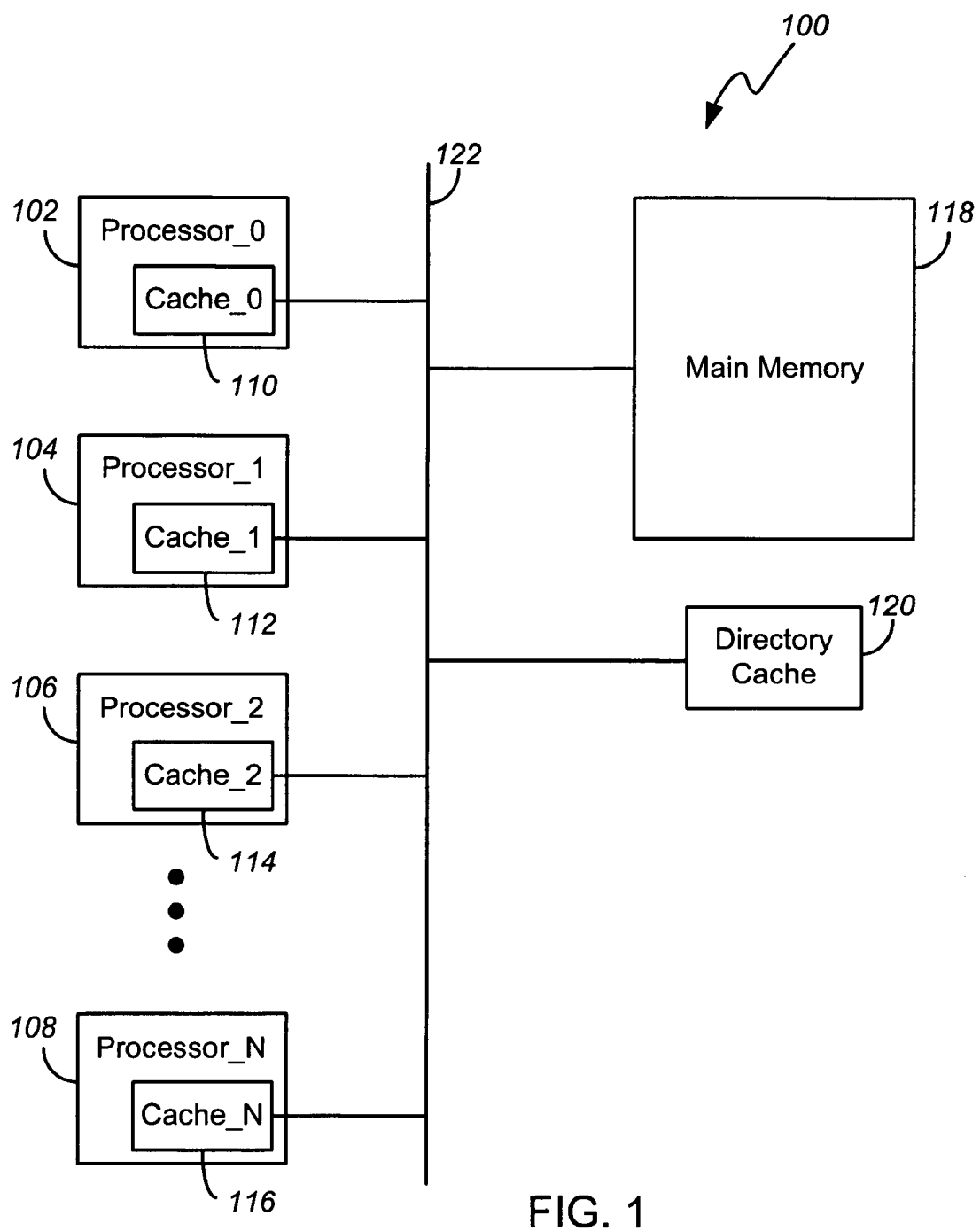
FIG. 1 illustrates an exemplary multiple processor computing system.

FIG. 1 illustrates an exemplary multiple processor computing system 100. The system 100 comprises a plurality of processors 102, 104, 106, 108, each of which caches lines of memory in one or more local caches 110, 112, 114, 116. At least some of the caches 110, 112, 114, 116 store lines of memory copied from a main memory 118 (or memories), such as a bank of dual in-line memory modules (DIMMs). Others of the caches may store lines of memory copied from other ones of the caches.

The system 100 also comprises a directory cache 120. The directory cache 120 stores information regarding the copies of memory lines stored in the system's caches 110, 112, 114, 116. Although the directory cache 120 is shown to be an integrated cache, existing in a single location, the directory cache 120 could alternately be implemented as a distributed cache, wherein the directory's entries are distributed amongst dedicated directory space (or other available cache space) that is distributed amongst two or more discrete locations (e.g., two or more of the system's caches). In some embodiments, part or all of the directory cache 120 may be contained within the main memory 118.

The processors 102, 104, 106, 108, caches 110, 112, 114, 116, main memory 118 and directory cache 120 may be coupled by one or more buses 122.

Figure 2:
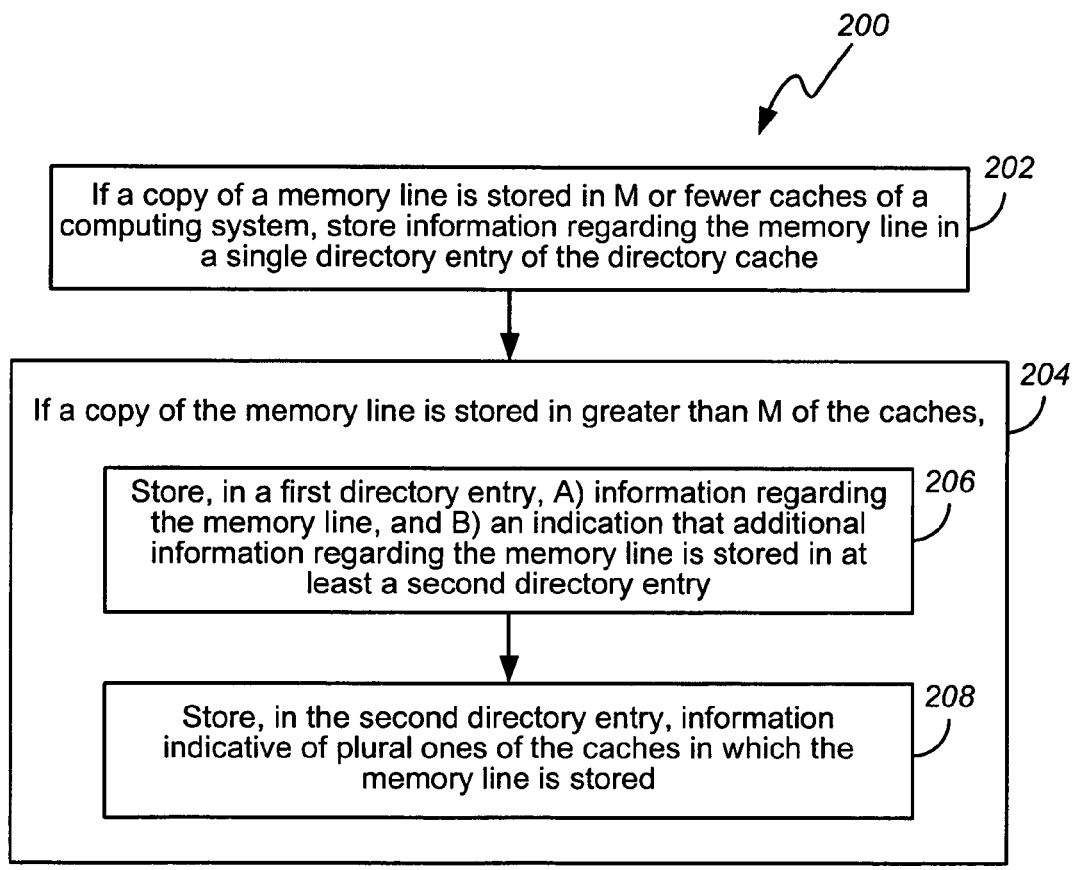
FIG. 2 illustrates a first exemplary method of operating a directory cache, according to the present invention.

FIG. 2 illustrates a first exemplary method 200 of operating a directory cache 120. In accord with the method 200, if a copy of a memory line is stored in M or fewer caches, information regarding the memory line is stored in a single directory entry of the directory cache (see block 202). However, if a copy of a memory line is stored in greater than M caches (block 204), then 1) a first directory entry is used to store information regarding the memory line, and an indication that additional information regarding the memory line is stored in at least a second directory entry (see block 206); and 2) the second directory entry is used to store information indicative of plural ones of the caches in which the memory line is stored (see block 208).

Figure 3:
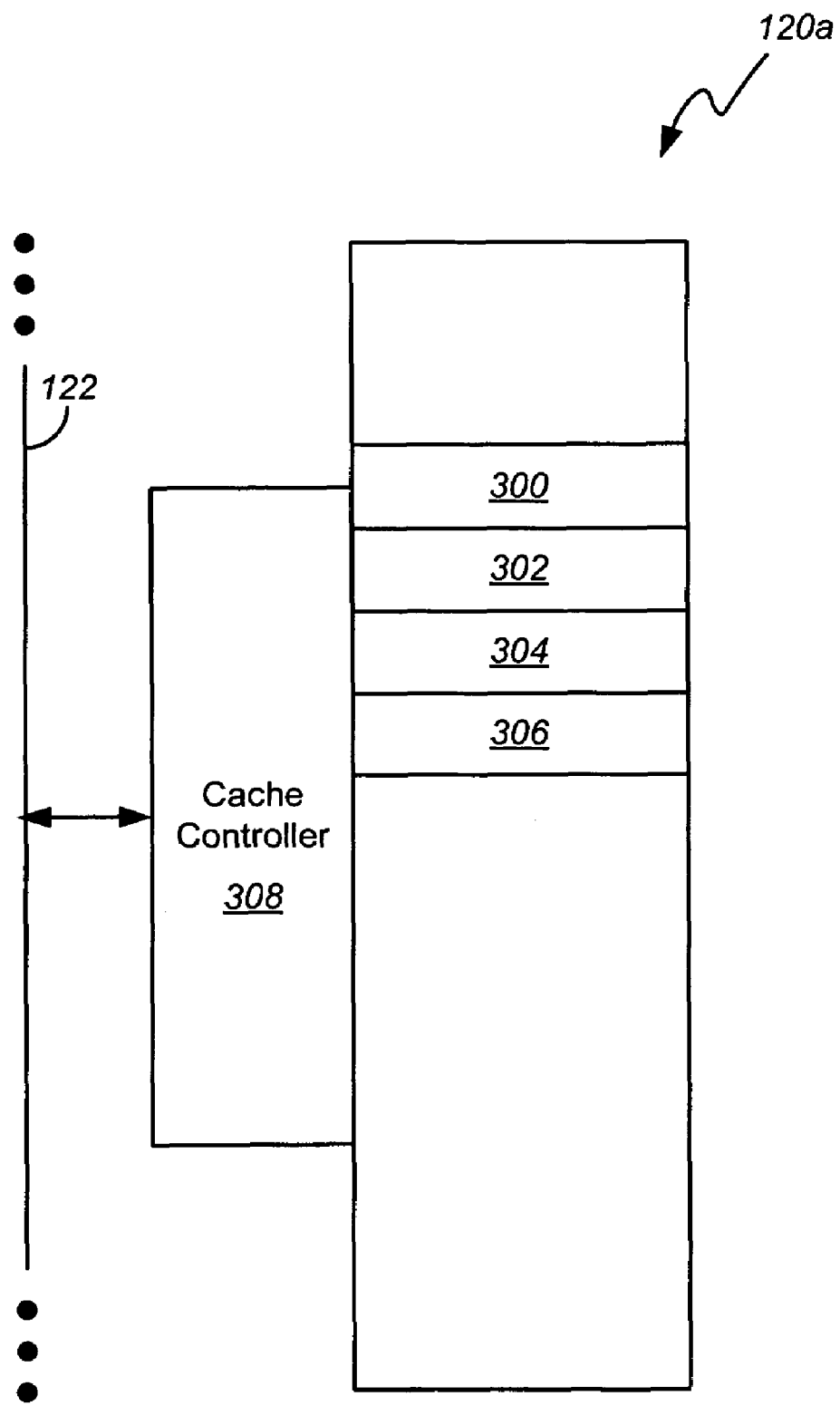
FIG. 3 illustrates an exemplary directory cache that may be used to implement the method shown in FIG. 2, according to the present invention.

An exemplary directory cache 120a that may be used to implement the method 200 is shown in FIG. 3. As shown, the directory cache 120a comprises a plurality of directory entries 300, 302, 304, 306 to store information regarding copies of memory lines that are stored in a plurality of caches. Although the directory cache 120a is shown to be an integrated cache, wherein all of the directory's entries 300, 302, 304, 306 are stored in a single location, the directory cache 120a could alternately be implemented as a distributed cache, wherein the directory's entries are distributed amongst dedicated or non-dedicated directory space that is provided in two or more discrete locations.

The directory cache 120a also comprises a cache controller 308. If a copy of a memory line is stored in M or fewer of a system's caches, the cache controller 308 stores information regarding the memory line in a single one of the directory entries 300. However, if a copy of the memory line is stored in greater than M of the system's caches, then the cache controller 308 stores, in a first directory entry 300, A) information regarding the memory line, and B) an indication that additional information regarding the memory line is stored in at least a second directory entry 302. The cache controller 308 then stores, in the second directory entry 302, information indicative of plural ones of the caches in which the memory line is stored.

In one embodiment, the information stored in the second directory entry 302 may comprise part or all of a share vector. In some cases, the state of each bit of the share vector may indicate whether a copy of a memory line is, or is not, stored in a particular cache. In these cases, a request to modify a memory line may result in each of the caches identified by the share vector being notified that their copy of the memory line needs to be marked invalid. In other cases, the state of each bit of the share vector may indicate whether a copy of a memory line is, or is not, stored in a particular group of caches. In these cases, a request to modify a memory line may result in each cache in each of the cache groups identified by the share vector being notified that their copy of the memory line needs to be marked invalid.

If only part of a share vector is stored in the second directory entry 302, the remaining part of the share vector may be stored in the first directory entry 300, or in yet another directory entry 304.

In yet another embodiment, the information stored in the second directory entry 302. may comprise a plurality of address pointers identifying particular ones or groups of a system's caches.

The indication that additional information regarding a memory line is stored in a second directory entry 302 may take various forms. In one embodiment, the indication may comprise a pointer, such as an address pointer. Logic (e.g., programmed circuits or firmware) of the controller 308 may then use the indication to specifically identify the second directory entry 302. Alternately, the indication could comprise multiple pointers, and the controller's logic could specifically identify each of a plurality of directory entries in which additional information regarding a memory line is stored. However, given that a pointer (e.g., an address pointer) may consume multiple bits, the indication that information regarding a memory line resides elsewhere may alternately take the form of a state of a single bit. In such a case, logic of the controller 308 may implement an algorithm to derive the identify of the second directory entry 302 based on the state of the bit (e.g., the second directory entry 302 could always be the next consecutive entry adjacent the entry 300).

In one embodiment, each of the directory entries 300, 302, 304, 306 may comprise a valid bit. With respect to a directory entry that serves as a "first" directory entry 300 for storing information regarding a particular memory line, the entry's valid bit may be set to a "valid" state. With respect to a directory entry that has been marked invalid, or a directory entry that serves as the "second" directory entry 302 for storing information regarding a particular memory line, the entry's valid bit may be set to an "invalid" state. In this manner, a directory entry which contains valid information, but which is not a "first" directory entry, can only be accessed via another directory entry. Alternately, a dedicated bit or bits may be used solely for the purpose of identifying a "second" directory entry as such.

Note that, other than a means to identify a "second" directory entry as such (e.g., a valid bit), the second directory entry 302 does not need to store any sort of overhead information. For example, the second directory entry 302 need not store an address tag, which in some caches can consume the large majority of a cache entry's bits. As a result, the use of first and second directory entries 300, 302 to store information regarding a memory line can yield much more than a doubling of the amount of directory information that can be stored for a memory line, and can instead yield a quadruple or more increase in the number of bits that are available to store directory information such as a share vector.

In some cases, the number of caches (M) which trigger the cache controller 308 to store information regarding a memory line in two directory entries, instead of one, is one (i.e., M=1). In this manner, whenever a memory line is shared by two or more caches, information regarding the memory line is stored in first and second directory entries 300, 302. In other cases, M may be an integer greater than one (i.e., if the format of a first directory entry 300 comprises a coarse-grain share vector or small number of pointers that enable a single directory entry to identify the locations of caches (or groups of caches) where a copy of a memory line is (or might be) stored.

In one embodiment, the format of the bits in a first directory entry 300 for storing information regarding a memory line may differ depending on whether a memory line is stored in M or fewer caches, or greater than M caches. For example, when first and second directory entries 300, 302 are employed for storing information regarding a memory line, a fine-grain share vector may be stored in the second directory entry 302, in lieu of a coarse-grain share vector being stored in the first directory entry 300

Figure 4:
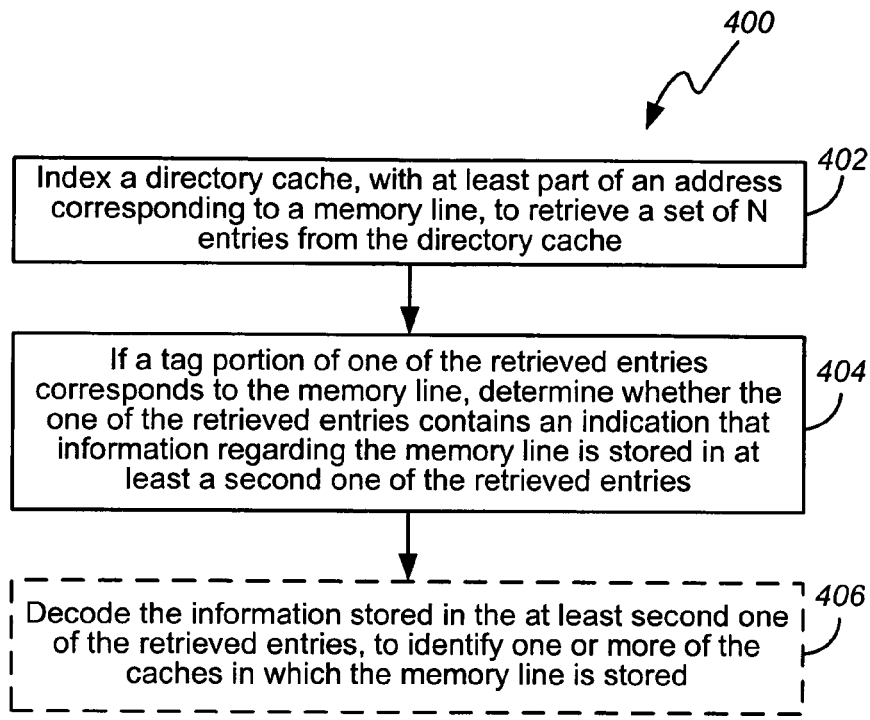
FIG. 4 illustrates a second exemplary method of operating a directory cache, according to the present invention.

FIG. 4 illustrates a second exemplary method 400 of operating a directory cache 120 (FIG. 1). In accord with the method 400, a directory cache 120 is indexed with at least part of an address corresponding to a memory line, thereby causing a set of N entries to be retrieved from the directory cache 120 (see block 402). If a tag portion of one of the retrieved entries corresponds to the memory line, it is then determined whether the entry contains an indication that information regarding the memory line is stored in at least a second one of the retrieved entries (see block 404). Optionally, the information stored in the at least second one of the retrieved directory entries may be decoded to identify one or more of the caches in which the memory line is stored (see block 406).

Figure 5:
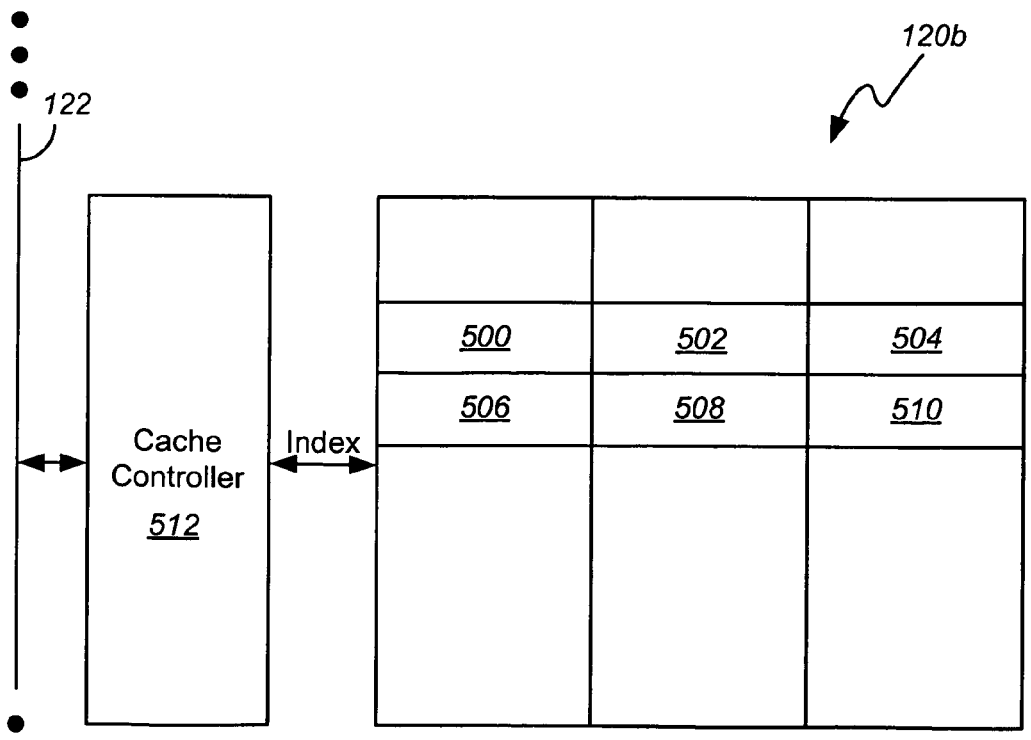
FIG. 5 illustrates an exemplary directory cache that may be used to implement the method shown in FIG. 4, according to the present invention.

An exemplary directory cache 120b that may be used to implement the method 400 is shown in FIG. 5, and may take the form of an N-way set-associative cache. The directory cache 120b comprises a plurality of directory entries 500, 502, 504, 506, 508, 510, each of which can store information regarding copies of memory lines stored in a plurality of caches, such as the caches shown in FIG. 1. The directory entries 500, 502, 504, 506, 508, 510 are divided into sets of N entries (e.g., 500, 502, 504), with each set of N entries being addressable via an index.

The directory cache 120b further comprises a cache controller 512. In response to an index associated with a particular memory line (e.g., a portion of a memory address), the cache controller 512 retrieves the set of N entries 500, 502, 504 that are associated with the index. The cache controller 512 then compares a tag portion associated with a particular memory line (e.g., another portion of the memory address) with tag portions stored with each of the retrieved directory entries 500, 502, 504. If a tag portion of one of the retrieved entries corresponds to the tag portion associated with the particular memory line, the cache controller 512 then determines whether the entry with a matching tag portion contains an indication that information regarding the particular memory line is stored in a second of the retrieved entries.

The "indication" in the one (or first) of the retrieved entries, and the "information" stored in the second of the retrieved entries, may take forms similar to those mentioned with respect to the method 200 (FIG. 2) and directory cache 120a (FIG. 3). In one embodiment, the "indication" that information regarding a memory line is stored in a second directory entry, in addition to a first directory entry, may be provided to the first entry any time the directory cache is employed to store information about a memory line. In another embodiment, the "indication" may only be provided when a memory line is stored in more than M caches. Thus, information regarding a memory line may be stored in a first format (i.e., in one directory entry) when a memory line is copied in fewer than M caches; and information regarding a memory line may be stored in a second format (i.e., in first and second directory entries) when a memory line is copied in more than M caches. To minimize the size and maximize the use of a directory cache, M will typically be set to one (i.e., M=1).

In many ways, the directory cache 120b may be implemented similarly to the directory cache 120a, and thus, the directory cache 120b may implement any or all of the features and improvements described for the directory cache 120a.

The methods and directory caches disclosed herein may be useful, in some contexts, in that they provide a means for expanding the number of share vector bits and/or pointers that can be used to identify individual ones or groups of caches in which copies of memory lines are stored. Yet, they can do so without necessitating an increase the size of a directory cache, and without reducing the capacity of a directory cache (since, if M=1, a second directory entry is only used when a copy of a memory line appears in at least two caches). In effect, the methods and directory caches disclosed herein enable an increase in the resolution of share vectors and the like by employing directory entries that would otherwise sit empty and unused. In the case of an N-way set-associative cache, the data field as well as the tag field of a "second" directory entry can be employed to increase the resolution of a share vector (or number of pointers).

What is claimed is:

1. A directory cache, comprising:
a plurality of directory entries configured to store information regarding copies of memory lines stored in a plurality of caches, the entries being divided into sets of N entries, with each set of N entries being addressable via an index; and
a cache controller configured to, retrieve a set of N entries associated with an index corresponding to a memory line; and
if a tag portion of one of the retrieved entries corresponds to the memory line, then determine whether the one of the retrieved entries contains an indication that information regarding the memory line is stored in at least a second one of the retrieved entries.

2. The directory cache of claim 1, wherein the information stored in the at least second one of the retrieved entries comprises information indicative of at least one or more of the caches in which the memory line is stored.

3. The directory cache of claim 2, wherein the information indicative of at least one or more of the caches in which the memory line is stored comprises a share vector.

4. The directory cache of claim 2, wherein the information indicative of at least one or more of the caches in which the memory line is stored comprises at least part of a share vector.

5. The directory cache of claim 2, wherein the information indicative of at least one or more of the caches in which the memory line is stored comprises a plurality of address pointers that identify particular ones or groups of the caches.

6. The directory cache of claim 1, wherein the index and tag portion corresponding to the memory line are portions of an address of the memory line.

7. The directory cache of claim 1, wherein each of the directory entries comprises a valid bit, and wherein, if information regarding the memory line is stored in the second one of the retrieved entries, the valid bit of the second one of the retrieved entries is set to an invalid state.

8. The directory cache of claim 1, wherein the indication that information regarding the memory line is stored in at least a second one of the retrieved entries is a state of a bit; and wherein the controller implements an algorithm to identify the second one of the retrieved entries based on the state of the bit.

9. The directory cache of claim 1, wherein the format of bits in the one of the retrieved entries differs depending on whether a memory line is stored in M or fewer caches, or greater than M caches.

10. The directory cache of claim 1, wherein the cache controller provides the one of the retrieved entries with the indication that information regarding the memory line is stored in at least a second one of the retrieved entries, and wherein the indication is provided when the memory line is stored in more than M caches.

11. The directory cache of claim 10, wherein M=1.

12. The directory cache of claim 1, wherein the cache controller uses i) the indication that information regarding the memory line is stored in at least the second one of the retrieved entries, to identify ii) a particular one of the retrieved entries in which information regarding the memory line is stored.

13. The directory cache of claim 1, wherein the cache controller uses i) the indication that information regarding the memory line is stored in at least the second one of the retrieved entries, to identify ii) a plurality of the retrieved entries in which information regarding the memory line is stored.

14. The directory cache of claim 1, wherein the cache controller comprises logic to derive i) identities of the at least second one of the retrieved entries, based on ii) existence of the indication that information regarding the memory line is stored in at least the second of the retrieved entries.

15. A directory cache, comprising:
a plurality of directory entries configured to store information regarding copies of memory lines stored in a plurality of caches; and
a cache controller configured to, if a copy of a memory line is stored in M or fewer of the caches, store information regarding the memory line in a single one of the directory entries, and if a copy of the memory line is stored in greater than M of the caches, then 1) store, in a first of the directory entries, A) information regarding the memory line, and B) an indication that additional information regarding the memory line is stored in at least a second one of the directory entries, and 2) store, in the second one of the directory entries, information indicative of plural ones of the caches in which the memory line is stored.

16. The directory cache of claim 15, wherein the information indicative of plural ones of the caches in which the memory line is stored comprises a share vector.

17. The directory cache of claim 15, wherein the information indicative of plural ones of the caches in which the memory line is stored comprises at least part of a share vector.

18. The directory cache of claim 15, wherein the information indicative of plural ones of the caches in which the memory line is stored comprises a plurality of address pointers that identify particular ones or groups of the caches.

19. The directory cache of claim 15, wherein each of the directory entries comprises a valid bit, and wherein, if additional information regarding the memory line is stored in the at least second one of the directory entries, the valid bit of the second of the directory entries is set to an invalid state.

20. The directory cache of claim 15, wherein the indication that additional information regarding the memory line is stored in the at least second one of the directory entries is a state of a bit; and wherein the controller implements an algorithm to identify the second one of the directory entries based on the state of the bit.

21. The directory cache of claim 15, wherein the format of bits in the first of the directory entries differs depending on whether a memory line is stored in M or fewer caches, or greater than M caches.

22. The directory cache of claim 15, wherein M=1.

23. A method of operating a directory cache that stores information regarding copies of memory lines stored in a plurality of caches, the method comprising:
indexing a directory cache, with at least part of an address corresponding to a memory line, to retrieve a set of N entries from the directory cache; and if a tag portion of one of the retrieved entries corresponds to the memory line, then determining whether the one of the retrieved entries contains an indication that information regarding the memory line is stored in at least a second one of the retrieved entries.

24. The method of claim 23, further comprising, decoding the information stored in the second of the retrieved entries, to identify one or more of the caches in which the memory line is stored.

25. The method of claim 24, wherein the decoded information comprises at least part of a share vector.

26. The method of claim 23, wherein determining whether the indication that information regarding the memory line is stored in the at least second one of the retrieved entries comprises implementing an algorithm to identify the second one of the retrieved entries based on a state of a bit.

27. A method of operating a directory cache that stores information regarding copies of memory lines stored in a plurality of caches, the method comprising:
- if a copy of a memory line is stored in M or fewer of the caches, storing information regarding the memory line in a single directory entry of the directory cache; and
- if a copy of the memory line is stored in greater than M of the caches, then, storing, in a first of the directory entries, A) information regarding the memory line, and B) an indication that additional information regarding the memory line is stored in at least a second one of the directory entries; and
- storing, in the second one of the directory entries, information indicative of plural ones of the caches in which the memory line is stored.

* * * * *